May 28, 1963  K. D. JOHNSON ETAL  3,091,437
MIXER

Filed April 4, 1960  4 Sheets-Sheet 1

INVENTORS
KENNETH D. JOHNSON,
ROLAND T. TALTON, JR. &
BY  NEWTON F. SPRAGGINS
Martha L. Ross
AGENT May 28, 1963　　　K. D. JOHNSON ETAL　　　3,091,437
MIXER Filed April 4, 1960　　　　　　　　　　　　4 Sheets-Sheet 2

INVENTORS
KENNETH D. JOHNSON,
BY　ROLAND T. TALTON, JR. 2nd
NEWTON F. SPRAGGINS
Martha L. Ross
AGENT INVENTORS
KENNETH D. JOHNSON,
BY ROLAND T. TALTON, JR. and
NEWTON F. SPRAGGINS
Martha L. Ross
AGENT INVENTORS
KENNETH D. JOHNSON,
ROLAND T. TALTON, JR. and
NEWTON F. SPRAGGINS
BY Martha L. Ross
AGENT

United States Patent Office 3,091,437
Patented May 28, 1963

3,091,437
MIXER
Kenneth D. Johnson, Vienna, and Roland T. Talton, Jr., and Newton F. Spraggins, Falls Church, Va., assignors to Atlantic Research Corporation, Fairfax County, Va., a corporation of Virginia
Filed Apr. 4, 1960, Ser. No. 19,950
12 Claims. (Cl. 259—104)

This invention relates to laboratory mixers particularly designed for the mixing of small batches in experimental work and for quick disassembly in the interest of thorough cleaning, so that successive batches of different substances can be mixed with minimum loss of time.

One of the objects of the invention is the provision of a mixer, the body of which does not come apart in the axial plane of the mixer blades for removal of the latter, but in which the body member is a single indivisible piece, access to which for the removal of the mixing blades, is had through the provision of a removable lateral head in which the bearings at one end of the mixer blades are contained.

Another object of the invention is to provide a laboratory mixer of the type described designed to fill a demand of workers in the field of relatively unstable substances or mixtures which may chance to "blow" or explode during the mixing, for a mixer that will ordinarily not be damaged or demolished by such a "blow."

Still another object of the invention in a mixer of the type described is the arrangement of O-rings in the bearings of the mixing blades whereby a novel and effective seal is maintained between journal and bearings to prevent leakage or seepage in either direction through the bearings.

A further object of the invention is to provide a mixer for small batches in which the upper face of the body member surrounding the mouth of the mixing chamber is planiform, and a cover having an O-ring on its under surface large enough to encompass the mouth of the mixing chamber, the O-ring resting freely upon the planiform top face of the body member so that vacuum applied to the mixing chamber draws the cover down sealingly upon the body member, but in the event of a "blow" the vacuum is instantly filled and the cover tossed aside without any build up of pressure in the mixing chamber. This is in contradistinction to the case in which the O-ring mounted on the edge of a cover would be in normally pressed sealing relation against the inside wall of the cylindrical mouth of a mixing chamber. The grip of the O-ring would persist regardless of the disappearance of the vacuum so that the result of a blow might be the same as that attending an obstruction in a gun barrel.

Still another object of the invention is to construct the body member as a large mass and make the mixing chamber a small cavity in said mass, the portion of the body member in a narrow zone surrounding the mouth of the mixing chamber functioning as a wide and substantially intact rim about the mouth of said mixing chamber reinforcing the walls of said mouth against fracture.

Other objects of the invention will appear as a description of a practical embodiment of the invention proceeds.

In the drawings which accompany and form a part of the following specification and throughout the figures of which the same reference characters have been used to denote identical parts.

Figure 1:
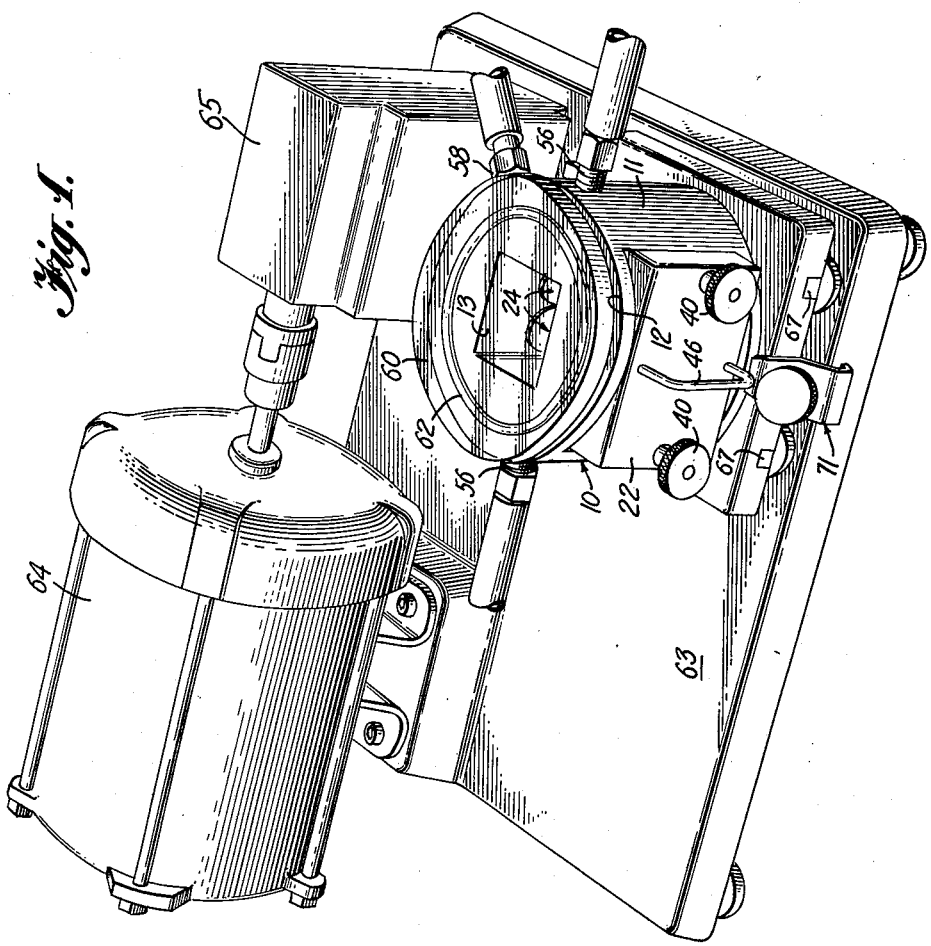
FIGURE 1 is a perspective view of the complete assembly of motor, gear box, and mixer.
Figure 2:
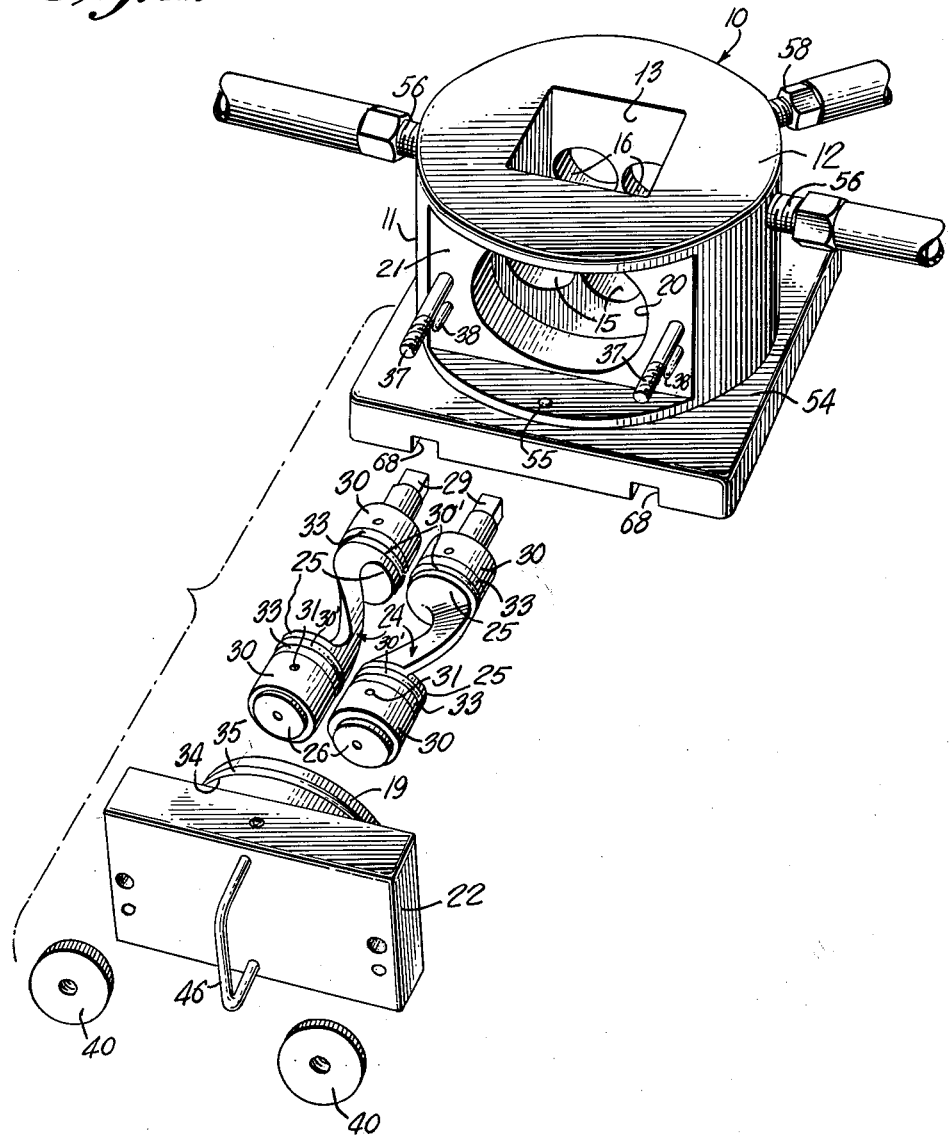
FIGURE 2 is a perspective view of the mixer, the parts shown being in separated relation in the direction of their parallel axes.
Figure 3:
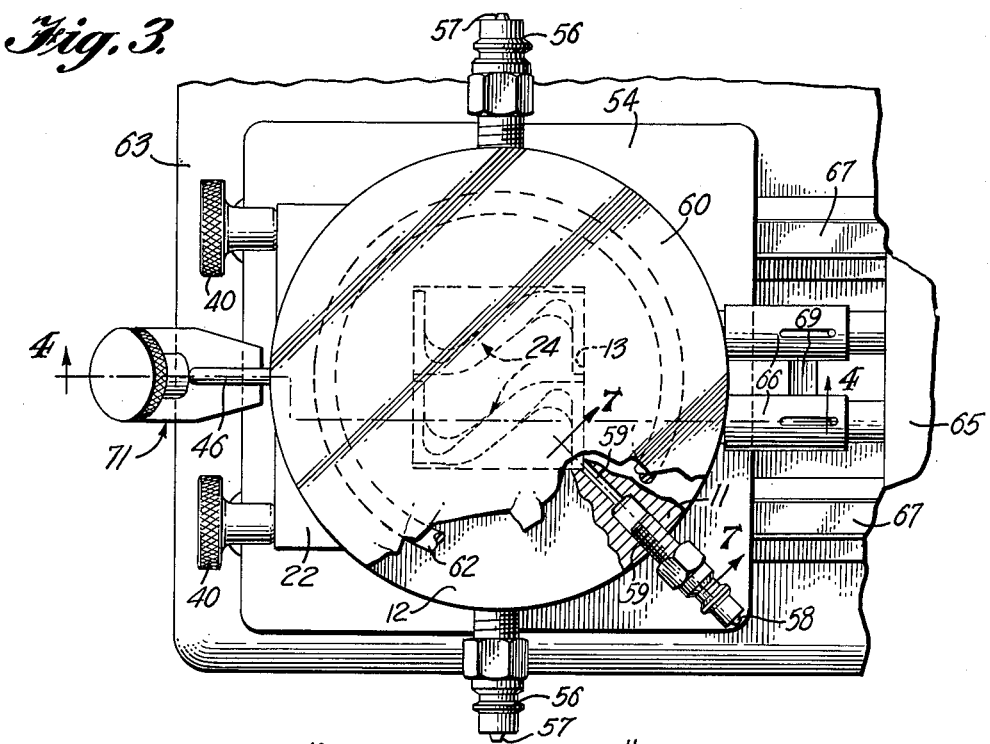
FIGURE 3 is a fragmentary plan view of the mixer.

Referring now in detail to the several figures, the mixer which as a whole is designated by the reference character 10, comprises, in conjunction with correlated elements which will in due course be described, a cylindrical body member 11, made of a strong material, preferably a metal such as stainless steel, having a planiform upper face 12 lying in a plane perpendicular to the axis of the body member. Said body member is formed in its upper portion with a deep recess 13 extending inward from said upper face, the walls of said recess defining a mixing chamber 14, designed in size to mix small batches, as, for example, of the order of about 75 cc. or less. The upper part of said recess is of rectangular cross section and is of relatively small area compared with that of the upper face 12, and preferably symmetrical with respect to the vertical axis of the body member so that it is circumscribed by quite a thick surrounding band of said body member. The rectangular portion of said mixing chamber extends downward to about the half-way level in the height of said body member. Below that level its bounding walls take the shape of two concave side by side semi-cylindrical troughs 15 of the same size and with their axes at the same level. These troughs terminate in the vertical planes of the opposite end walls of said recess which are perpendicular to their axis. They are open at both ends.

Cylindrical bearing apertures 16 coaxial with the troughs, adjoin them at one end, extend through the mass of the body member. The latter is formed on the outside wall with an inset flat face 17, perpendicular to the axes of the troughs, in which said bearing apertures open. They have substantially the same radius as said troughs.

A portion of the end wall of the mixing chamber at the end of the troughs 15 opposite the flat face 17 is removable. This portion comprises the inner face 18 of a cylindrical head 19, the latter being a sliding fit in a cylindrical head receiving aperture 20, which penetrates the body member within the area of a planiform face 21 formed on the body member parallel to the face 17. The head 19 is integral with a rectangular block 22, the latter fitting against the planiform face 21. When the said block is against said face, the inner end of the head 19 lies flush with the fixed portion of said end wall. The axis of the head 19 is in the common horizontal plane which embraces the axes of the troughs and is equi-distant from each of the latter axes. The head 19 carries two bearing apertures 23. These open in the face 18 of the head and extend into the block 22, being closed at their inner ends. They are coaxial with the troughs 15 and the bearing apertures 16 when the head is in place.

The body member is furnished with a pair of cooperating rotary mixing blades 24, commonly known as sigma-blades, from the appearance of their mixing portion viewed either in plan or side elevation. Each is provided with circular end portions 25 of substantially the same diameter as the bearing apertures and having planiform outer faces which fit close to the planes of the respective end walls and from which the journals 26 extend. The mixing portion of the blade is a helically twisted element 27, extending between the end portions 25. Each blade at one and the same end is formed with a coaxial extension 28 of smaller diameter than the adjacent journal and terminates in a polygonal coupling end 29. Mounted upon each journal are the following elements, an annular spacer 30', which is preferably of a strong, rigid plastic, such as nylon, and is of relatively short length. This makes a sliding fit upon the journal and with the wall of the bearing aperture in a zone adjacent the planiform outer faces of the circular end portions 25. In a zone adjacent their outer ends the journals are surrounded by close fitting cylindrical, preferably nonmetallic bushings 30, which are fixed to the journals by means of the pins 31, thus being in effect a part of said journals. The material of the bushings is preferably a strong, rigid plastic, such as nylon, which is long wearing, does not appreciably wear the metal walls of the bearing apertures, retains the precise shape and size of the parts in which it is embodied through long periods of storage as spare parts, and is inert towards a great many substances likely to become the subject of experimental mixing.

The bushings 30 are sized to make a close sliding fit with the surrounding bearing apertures. Each of the bushings defines with the corresponding spacer a circumferential groove 32 about the journal, of fixed width in which an O-ring 33 is seated. When the mixing blades are mounted in operative position the O-rings are pressed against the surface of the bearings forming an effective seal, which prevents the leakage of fluids around the bearings from the mixer and prevents leakage of air from atmosphere into the mixer by way of the bearings when the mixer is operating under vacuum. It will be understood that a single bushing having a circumferential, annular groove to receive the O-ring seal can be employed in place of the separate bushing member 30 and spacer 30'.

The head 19, which, as stated, carries two of the bearing apertures, is formed with a circumferential groove 34 in which an O-ring 35 is seated, pressing against the inner face of the aperture 20, providing an effective seal at the joint between the head and body member. Nylon washers 36 are seated in the closed ends of said bearing apertures which act as end thrust bearings for the ends of the adjacent journals. The body member 11 is provided with studs 37 projecting perpendicularly from the planiform face 21 at opposite sides of the aperture 20, preferably in the horizontal diametrical plane of said aperture, and the block 22 is formed with holes that register with said studs to receive the same when the block and head are properly oriented with respect to the head receiving aperture. In order more readily to find this precise position, the body member is provided with bullet nosed pins 38 at suitable points extending perpendicularly from the face 21 adapted to register and precisely slidably fit into complementary pin holes 39 formed in the block.

In assembling the mixing blades with the body member 11, the journals 26 which do not have the extensions 28, are thrust into the bearing apertures 23 to the full depth of the latter until the ends of the journals abut the nylon end thrust washers 36. When the journals are in this position the O-rings 33 are in pressed relation to the journals and the walls of the surrounding apertures so that the mixing blades are firmly held perpendicular to the face of the head 19. This makes it easy for the operator, holding the block 22, to aim the journals which have the extensions 28 at the far bearing apertures 16, and, guiding the block on the alining pins 38 to introduce the forward ends of the last mentioned journals into the said bearing apertures. By this time the head 19 will have moved in until the outer circumference of the O-ring 35 is against the rim of the head receiving aperture 20. Due to the relative large circumferential extensiveness of this O-ring it interposes considerable resistance to the effort to make it enter the aperture 20. The knurled nuts 40 which screw upon the studs 37 and engage the block 22 are useful to overcome this resistance and are screwed down until the block is in firm surface contact with the planiform face 21 of the body member.

At this stage of assemblage the outer ends of the journals which occupy the bearing apertures 16 are substantially flush with the surface of the planiform face 17. A plate 41 fits against this latter and smaller face. It has two holes 42 therethrough so positioned and sized that when the plate 41 is in place, said holes freely surround the extensions 28 which project through and beyond them. The holes 42 are counterbored on the inner side of the plate to form shallow annular rabbets 43, surrounding said holes and which provide seats for two annular nylon washers 44, which function as end thrust bearings for the adjacent journals. These washers 44 have larger inside diameters than the washers 36 since they surround the extensions. The plate 41 is secured to the body member by means of cap screws 45, the latter passing freely through holes in the block and screwing into threaded registering bores in the body member within the area of the planiform face 17.

When the head block 22 and plate 41 are in secure position there is but little clearance between the ends of the journals and the opposite sets of nylon washers. Their purpose is to prevent material lateral slippage of the O-rings 33 against the surrounding bearing walls which would unduly wear the O-rings.

The pressure at the interface between the head block and the adjacent planiform face of the body member, and at the interface between the plate 41 and the planiform face 17, exerted by the respective knurl nuts and cap screws is adequate for all practical purposes, since the O-rings in the bearings and the O-rings about the head effectively seal the bearings and the divided wall of the mixing chamber against fluid leakage in either direction.

When it is desired to clean the blade units, the handle 46 facilitates the withdrawal of the head. The handle, in the form shown, is of rectangular U-shape, the legs 47 being inserted in bores in the plate 41 adjacent opposite sides. The legs have notches 48 in their outer sides entered by set screws 49 threaded through cross bores that open in registry with said notches, and by which said handle is secured. If the blade units do not come out with the head, then removal can be assisted by inward pressure upon the coupling ends 29. The O-ring 33 can be removed by inserting a knife blade or similar device beneath the ring and stretching it enough, within its elastic limits, to be able to slip it over the nylon bushing 30. It is good practice to replace the bearing O-rings after a limited number of mixings regardless of their appearance of worthiness. For a thorough cleaning of the lower part of the mixing chamber the plate 41 as well as the head plate 22 can be removed, providing through access at trough level for a brush.

Figure 4:
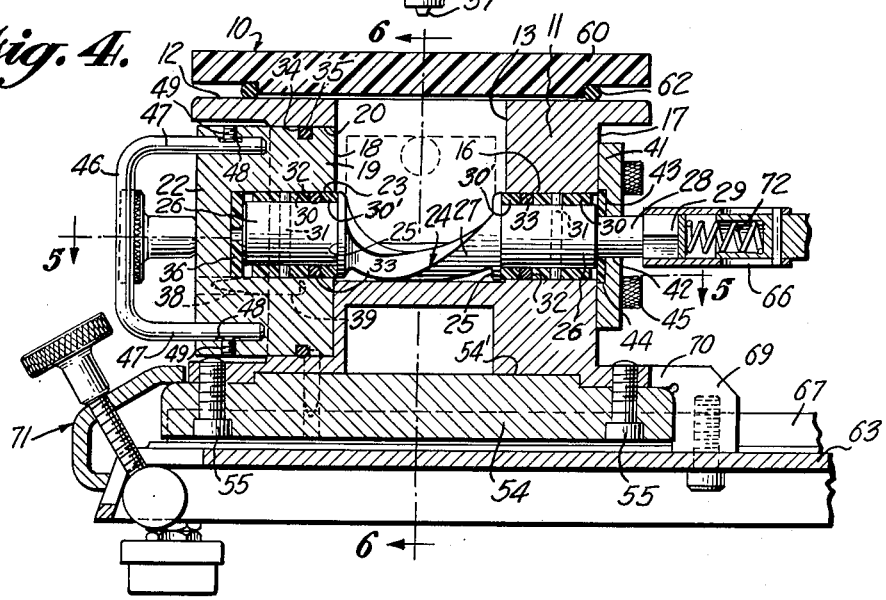
FIGURE 4 is a longitudinal vertical sectional view taken along line 4—4 of FIGURE 3.
Figure 5:
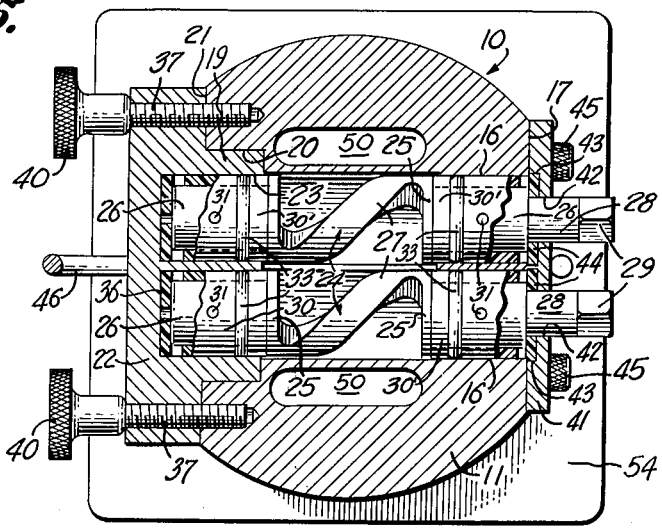
FIGURE 5 is a horizontal sectional view taken on line 5—5 of FIGURE 4.
Figure 6:
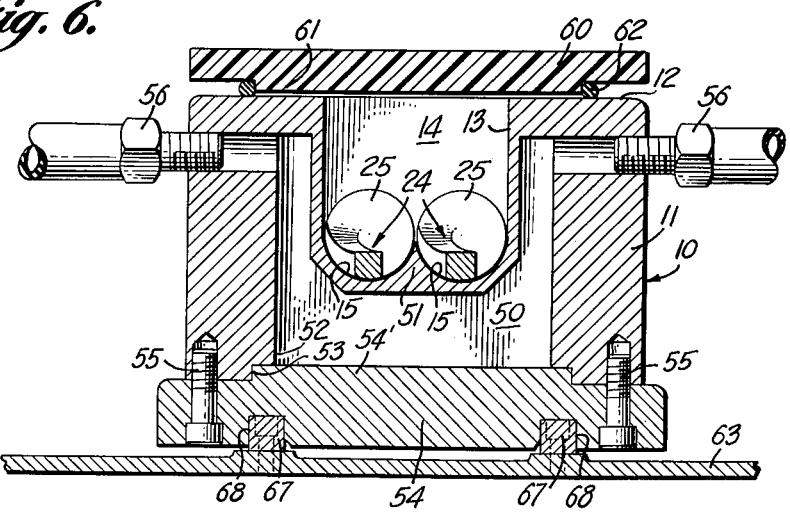
FIGURE 6 is a vertical transverse sectional view taken along line 6—6 of FIGURE 4.
Figure 7:
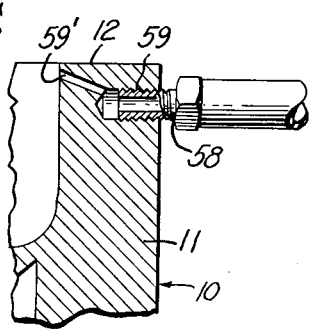
FIGURE 7 is a sectional view of a detail, taken along line 7—7 of FIGURE 3.

The body member is so constructed as to provide a chamber for the circulation of a fluid heating or cooling medium in heat exchanging relation to the side and bottom walls of said mixing chamber. As shown in the drawings, the body member is cored out or otherwise provided with an internal chamber 50, which underlies the bottom wall of the mixing chamber and extends up along the opposite sides of the mixing chamber that lie parallel to the axes of the troughs 15. The chamber 50 is of uniform width, being slightly narrower than the length of the troughs, as shown in FIGURE 4 and inset with respect to parallel vertical planes passing through the ends of the troughs. The fluid chamber as shown in FIGURES 5 and 6, and indicated in broken lines in FIGURE 4 extends upward along the sides of said mixing chamber substantially as far as a horizontal plane passing through the upper edges of the planiform faces 17 and 21, which are an appreciable distance below the upper face of the body member. The fluid chamber does not extend upward between the troughs, thus leaving a deep and massive integral rib 51 between the troughs, which rib materially reinforces the bottom of the mixing chamber. The fluid chamber 50 opens in the lower face of the body member in a rectangular opening 52 of oblong shape. A circular rabbet 53 circumscribes said opening, in low relief, spaced from the perimeter of said opening. The body member 11 is secured to the base 54 by cap screws 55. The base is formed with a flat circular boss 54' on top, sized to fit said rabbet congruently and forming the bottom of the fluid chamber 50. The engaging faces of said boss and rabbet are carefully machined so that when said cap screws are tight the interface between said rabbet and boss is fluid tight.

Coupling nipples 56 are screwed into bores in those opposite sides of the body member which jacket the upwardly extending limbs of the heat exchanging fluid chamber at such points as to communicate with said limbs at or near their upper ends. Each of said nipples is provided with a check valve 57, which may be conventional, as shown, consisting of a ball spring-biased to close in an outward direction, and being positively opened by contacting means associated with complementary coupling elements at the end of flexible hoses, not shown, which deliver and take away the coolant or heating fluid, as the case may be. In the act of connecting the hoses the contact means push the check valves open against spring bias establishing a through way for the flow of fluid through the fluid chamber, and when the hoses are removed the check valves automatically close maintaining the fluid chamber filled with fluid.

A somewhat smaller nipple 58 is screwed into a bore 59, preferably located adjacent the planiform face 17, said bore being at substantially the same level as the bores for the nipples 56, but passing only part way through the body member, joining a bore 59' of smaller diameter which extends inclinedly upward and opens in a corner of the mixing chamber close to the upper end of the mixing chamber so as to minimize the risk of the mixture getting into said bore during the mixing. The nipple 58 is for connection to the coupling of a flexible hose of a vacuum pump, not shown.

It will be noted that the planiform faces 17 and 21 are spaced from the circular top of the body member, also the nipples 58 and the bore 59. This arrangement provides a substantially unbroken rim of extensive thickness in a horizontal plane, surrounding the upper portion of the mixing chamber, heavily reinforcing the latter from possible fracture under the impact pressure of an accidental "blow" or detonation of the mix.

The mixer may optionally be operated open to atmosphere, closed by a cover at atmospheric pressure, or operated under vacuum. The cover 60, which is preferably circular, as shown, is made of Plexiglas or similar non-shatterable material and is a rigid planiform sheet shown here as having the same diameter as the body member, though this is not necessary, it being essential only that it be of adequate size sealingly to cover the mouth of the mixing chamber. The cover is adapted to be positioned congruently with respect to the upper face of the body member, having an integral concentric planiform circular boss 61 on one side. The boss has a circumferential edge face about which an O-ring 62 is stretched so as to retain its position on the cover. The diameter of the boss is greater than the longest dimension of the cross sectional area of the mixing chamber at its mouth and the O-ring is of such size as to extend depthwise beyond the boss which it surrounds so that when the cover is in place, resting on the O-ring, the entire area of the boss is out of contact with the face of the body member and subject to the pull of vacuum. When the mixer is connected to the vacuum pump the result is a strong adhesion of the cover to the body member so long as vacuum is being pulled and for several hours after the mixer has been disconnected from the pump. If, while the mixing is being done under vacuum, the mix should "blow" there would be no build up of pressure, for the vacuum would be instantly filled and the adhesion of the cover to the top of the body member would disappear at the same moment so that there would be no resistance to the free discharge of the blast other than the mere weight of the cover. This expedient eliminates or minimizes damage to the mixer should the contents "blow."

The laboratory mixer is designed as the detachable and portable member of a unitary group which includes also a platform 63 and an electric motor 64, and gear box 65, mounted on said platform, the gear box containing gearing, not shown, driven by the motor and terminating in a pair of parallel coupling elements 66 rotatable in opposite directions, and one preferably a little faster than the other. The platform is provided with tracks 67 parallel to the axes of the coupling elements 66, while the base 54 of the mixer is formed with guide grooves 68 on its under face spaced and sized to fit over the tracks with a close sliding fit. The track grooves are parallel to the axes of the mixing blades. The coupling elements 66 are socketed at their forward ends and shaped to slidably fit over the polygonal ends 29 of the extensions 28. The coupling elements 66 contain springs 72 which keep them pushed forward. The mixer is mounted in operative relation to the gear box by placing it upon the platform with the grooves of its base over the tracks and the coupling ends of the mixing blades directed toward the socketed coupling elements 66. The mixer is then pushed along the tracks until the male polygonal coupling elements meet the socketed coupling elements and push them backward contra to their spring bias. A stop 69 secured to the platform adjacent the gear box, in the path of movement of the mixer limits the travel of the mixer toward the gear box and has a portion 70 that snugly overhangs the adjacent edge of the platform, holding it down. When the motor is started, the socketed coupling elements rotate until they are in phase with the polygonal ends of the male coupling elements and then spring forward into telescoped relation to the male elements. It is, of course, not essential that both pairs of coupling members shall get in phase simultaneously.

At the end of the platform adjacent the forward ends of the tracks is a releasable clamp 71, which overlies the forward edge of the platform and holds it down and fixed.

It is to be understood that while the mixing is in progress the nipples 56 will be connected to flexible conduit members carrying cooling or heating fluid to and from the chamber 50. Also if the mixing is to be done under a vacuum, the nipple 58 will be connected to a vacuum pump or its equivalent. If the mix is neither to be heated nor cooled the hose to the nipples 56 may be disconnected. Likewise, if the mixing is not to be done under vacuum, the vacuum hose will be disconnected.

When the mixing has been completed, the hoses, if any were used during the mixing, may be disconnected, the clamp 71 released, the mixer drawn forward a little on the tracks to release the couplings and it may then be lifted from the platform and becomes portable.

Pouring is done by tilting the body member and pouring from the corner opposite the vacuum nipple 55. The vacuum nipple serves as an index to identify which corner never to pour from, to avoid getting material into the passage 59'.

Neither the gear box per se nor its contents, nor the unitary assemblage of motor, gear box and mixer, with the latter approachable on tracks toward the gear box, are claimed as part of this invention.

While we have in the above description disclosed what we believe to be a practical and efficient embodiment of the invention, it will be understood by those skilled in the art that the specific details of construction and arrangement of parts as shown are by way of example and not to be construed as limiting the scope of the invention.

What we claim is:

1. Laboratory mixer for small batches comprising an integral body member having a centrally located recess therein opening in the top of said body member and extending downward therefrom forming a mixing chamber, said body member being formed on the outside with a planiform face laterally of said mixing chamber and formed with a cylindrical passage extending inwardly from said planiform face to said mixing chamber, the horizontal overall area dimensions of said body member being significantly larger than the corresponding dimensions of said mixing chamber so that the body member is thick walled and the cylindrical passage of significant length, a removable head fitting said passage, its inner end forming part of a wall of said mixing chamber, coaxial bearing sockets opening into said mixing chamber from opposite sides, those at one side extending into said head and terminating in closed ends, those at the remote side extending through the wall of said body member opening at the outside thereof, mixing blade units comprising journals in said bearing sockets, mixing elements between said journals within said mixing chamber and extensions projecting beyond the remote bearing sockets having coupling elements at their outer ends, a block rigidly united with the outer end of said head, said block having a planiform face about said head in surface engagement with said planiform face of the body member, and means for securing said block to said body member.

2. Laboratory mixer for small batches as claimed in claim 1, said head being formed with a circumferential groove spaced from the inner end of said head, and an O-ring seated in said groove and pressing the wall of the surrounding passage, sealing the interface between said head and passage wall, said means for securing said block to said body member comprising parallel studs projecting perpendicularly from said body member in the area of said planiform face, and passing through apertures extending through said block, of such length as to project from said block when said head is inserted in said passage to the extent that said O-ring is against said planiform face, and knurled nuts on said studs for successively forcing said O-ring into the joint between said head and the wall of said passage and advancing said block and head into secured position.

3. Laboratory mixer for small batches comprising an integral body member having a planiform upper face and a recess extending downward from the middle area of said face forming a mixing chamber, driven mixing blades in said chamber journaled in adjacent bearings at opposite sides of said mixing chamber, a cover for said mixing chamber having a peripheral rabbet on its underside defining a boss, said boss having a planiform under face, of such size and shape as to extend beyond the perimeter of the mouth of said mixing chamber all around and being exclusively outside of said mixing chamber, said boss having a bounding edge portion perpendicular to the planiform face of said boss, an O-ring stretched about said boss and thereby retained against said edge portion, said O-ring being of such size as to extend below said boss, said cover being normally supported gravitationally through said O-ring upon the planiform upper face of said body member, unencumbered by the weight of additional structure.

4. Laboratory mixer for small batches of a type in which the mixing elements can readily be removed, comprising an integral thick walled body member having a centrally located recess therein extending downward from the top face of said body member, forming a mixing chamber, the lower part of said recess being shaped to form twin semicylindrical troughs open in an upward direction having parallel axes in a plane level when the mixer is in normal operative position, said body member being formed at one side with a cylindrical lateral passage extending from the outside of said body member to said mixing chamber, its axis being parallel to the axes of said troughs, a cylindrical head slidably fitting said passage, its inner end forming at least part of the adjacent wall of said mixing chamber, said head and the opposite wall of said body member being formed, each with a laterally spaced pair of bearing sockets, the corresponding sockets of said pairs being coaxial, the bearing sockets of said head being blind and those of said opposite wall extending through said wall, mixing blade units, each comprising a mixing element positioned in a corresponding trough and elongated cylindrical journals adjacent the ends of said mixing element occupying corresponding sockets in said wall and head, in fitting relation thereto, said mixing elements having greater radial amplitude than said journals, the bearing sockets in said head and the journals that occupy said sockets being of such length as in themselves to maintain the axes of the blade units parallel to the axis of the head, whereby, in replacement of the united head and blade units, during transit of said head in said passage, said blade units are in axial alignment wtih the bearing sockets in said opposite wall.

5. Laboratory mixer as claimed in claim 4, said body member having a lateral exterior flat face perpendicular to the axis of said lateral passage and surrounding the outer end of said passage, a block rigid with said head having a complementary flat face engaging said surrounding face, limiting the incursion of said head into said passage and means for securing said block to said body member.

6. Laboratory mixer as claimed in claim 4, the diameter of said passage being such that its circumference at its inner end intersects the plane of the adjacent wall of said mixing chamber at a distance below the top of said chamber.

7. Laboratory mixer as claimed in claim 4, said head being provided with a circumferential groove in an intermediate zone, and an O-ring seated in said groove in sealing contact with the surrounding wall of said passage.

8. Laboratory mixer as claimed in claim 4, said body member having a lateral exterior flat face perpendicular to the axis of said lateral passage and surrounding the outer end of said passage, a block rigid with said head having a complementary flat face engaging said surrounding face limiting the incursion of said head into said passage, said block being provided with spaced apertures therethrough parallel to the axis of said head, parallel pins fixed to the body member within the area of said flat face registrable with said apertures, said pins having cam-contoured ends shaped to guide said head, upon initial entry of said pins into said apertures, to a position in which the axes of the blade units carried by said head are coaxial with the opposite wall sockets.

9. Laboratory mixer for small batches comprising an integral body member having a centrally located recess therein extending downward from the top of said body member and opening in said top forming a mixing chamber, said body member being formed on the outside with oppositely positioned, parallel, planiform faces perpendicular to the plane of the top of said body member indented in opposite sides of said body member below the top thereof, said body member being formed with a cylindrical passage extending inwardly from one of said planiform faces to said mixing chamber, said body member being thick walled laterally about said mixing chamber and the cylindrical passage being therefore of significant length, a removable head slidably fitting said passage, its inner end forming part of a wall of said mixing chamber, coaxial bearing sockets opening into said mixing chamber from opposite sides, those at one side extending into said head and terminating in closed ends, those at the remote side extending through the wall of said body member opening in the other planiform face, mixing blade units comprising journals in said bearing sockets, mixing elements between said journals, in said mixing chamber, and extensions projecting beyond the remote bearing sockets having coupling elements at their outer ends, said mixing elements having greater radial amplitude than said journals, a block rigidly united with the outer end of said head, said block having a planiform face about said head in surface contact with the corresponding planiform face of said body member, a plate having a planiform face in surface contact with the opposite planiform face of said body member having apertures through which the extensions of said mixing blade units pass, and means for securing said block and said plate to said body member.

10. Laboratory mixer for small batches comprising an integral body member having a centrally located recess therein extending downward from the top of said body member and opening in said top, forming a mixing chamber, said body member being formed with a cylindrical, lateral passage extending from the outside of said body member to said mixing chamber, a removable head fitting said passage, its inner end forming part of a wall of said mixing chamber, the bottom of said mixing chamber being shaped to form twin semi-cylindrical troughs open in an upward direction, having parallel axes, said head and the opposite wall of said body member being formed each with a laterally spaced pair of bearing sockets, the corresponding sockets of said pairs being coaxial and axially parallel to said troughs, the bearing sockets of said head being closed at their inner ends and those of said opposite wall extending through said wall, mixing blade units removable with said head, each comprising a mixing element positioned in a corresponding trough, and cylindrical journals adjacent the ends of said mixing element occupying corresponding sockets in said opposite wall and head, said body member being formed with a chamber extending about the bottom of said mixing chamber and upward along those sides thereof which lie lengthwise of said troughs, to conduct a heat exchange medium in functioning relation to the walls of said mixing chamber, the width of said chamber for heat exchange medium being confined within a zone between planes embracing the ends of said troughs perpendicular to the axes thereof.

11. Laboratory mixer as claimed in claim 10, said chamber for heat exchange medium having an opening in the lower face of said body member, said lower face being indented by an annular rabbet the outer edge of which widely circumscribes said opening, and a base plate secured to said body member having a boss fitting said rabbet in fluid-tight manner.

12. Laboratory mixer as claimed in claim 10, said chamber for heat exchange medium having an opening in the lower face of said body member, said lower face being indented by an annular rabbet the outer edge of which widely circumscribes said opening, a base plate secured to said body member having a boss fitting said rabbet in fluid-tight manner, coupling members carried by said body member communicating with said heat exchange medium chamber for connecting said chamber in circulatory relation with a source of said medium, said coupling members being provided with check valves operative to retain the medium in said chamber when the mixer is disconnected from said source.

References Cited in the file of this patent

UNITED STATES PATENTS

| | | |
|---|---|---|
| 913,337 | Wiffin | Feb. 23, 1909 |
| 1,989,126 | Beran et al. | Jan. 29, 1935 |
| 2,090,527 | Evans | Aug. 17, 1937 |
| 2,118,884 | Fuchs | May 31, 1938 |
| 2,394,364 | Christensen | Feb. 5, 1946 |
| 2,599,003 | Leonard | June 3, 1952 |
| 2,657,022 | Spiess et al. | Oct. 27, 1953 |
| 2,761,657 | Rietz | Sept. 4, 1956 |
| 2,777,177 | Steinback et al. | Jan. 15, 1957 |
| 2,931,633 | Rumbel et al. | Apr. 5, 1960 |
| 2,950,094 | Garmy | Aug. 23, 1960 |